United States Patent
Wobben

(10) Patent No.: US 7,023,105 B2
(45) Date of Patent: Apr. 4, 2006

(54) ATMOSPHERIC DENSITY-DEPENDENT POWER ADJUSTMENT FOR WIND TURBINES

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 64 days.

(21) Appl. No.: 10/468,336

(22) PCT Filed: Feb. 21, 2002

(86) PCT No.: PCT/EP02/01814

§ 371 (c)(1),
(2), (4) Date: Jan. 2, 2004

(87) PCT Pub. No.: WO02/068818

PCT Pub. Date: Sep. 6, 2002

(65) Prior Publication Data

US 2004/0135375 A1 Jul. 15, 2004

(30) Foreign Application Priority Data

Feb. 28, 2001 (DE) ................................. 101 09 553

(51) Int. Cl.
*F03D 7/04* (2006.01)
*H02P 9/04* (2006.01)

(52) U.S. Cl. ............................. 290/44; 290/43; 290/55

(58) Field of Classification Search ................. 290/43, 290/44, 54, 55; 416/31; 417/334; 322/59, 322/35

See application file for complete search history.

(56) References Cited

U.S. PATENT DOCUMENTS

| | | | | |
|---|---|---|---|---|
| 4,331,881 A | * | 5/1982 | Soderholm et al. | 290/44 |
| 4,349,877 A | | 9/1982 | Oyama et al. | |
| 4,464,579 A | * | 8/1984 | Schwarz | 290/44 |
| 4,525,633 A | * | 6/1985 | Wertheim et al. | 290/44 |
| 4,535,252 A | * | 8/1985 | Jacobs et al. | 290/44 |
| 4,651,017 A | | 3/1987 | Longrigg | |
| 5,083,039 A | * | 1/1992 | Richardson et al. | 290/44 |
| 5,106,265 A | * | 4/1992 | Holzem | 416/23 |
| 5,155,375 A | * | 10/1992 | Holley | 290/44 |
| 5,289,041 A | * | 2/1994 | Holley | 290/44 |
| 6,137,187 A | * | 10/2000 | Mikhail et al. | 290/44 |
| 6,320,272 B1 | * | 11/2001 | Lading et al. | 290/44 |
| 6,608,397 B1 | * | 8/2003 | Makino et al. | 290/44 |
| 6,724,097 B1 | * | 4/2004 | Wobben | 290/44 |
| 6,864,594 B1 | * | 3/2005 | Seki | 290/44 |
| 6,909,198 B1 | * | 6/2005 | Ragwitz et al. | 290/44 |
| 6,921,985 B1 | * | 7/2005 | Janssen et al. | 290/44 |
| 6,946,751 B1 | * | 9/2005 | Yoshida et al. | 290/44 |

FOREIGN PATENT DOCUMENTS

| | | |
|---|---|---|
| DE | 195 28 862 A1 | 2/1997 |
| DE | 195 32 409 A1 | 3/1997 |
| DE | 198 44 258 A1 | 3/2000 |
| DE | 199 48 194 A1 | 4/2001 |
| EP | 0 394 882 | * 4/1990 |
| EP | 0 884 833 A1 | 12/1998 |
| WO | WO 9404820 A1 | 3/1994 |
| WO | WO 0075508 A1 | 12/2000 |

* cited by examiner

*Primary Examiner*—Nicholas Ponomarenko
(74) *Attorney, Agent, or Firm*—Neil A. Steinberg

(57) ABSTRACT

The present invention concerns a wind power installation having a control apparatus for operational management of the wind power installation and a method of controlling a wind power installation having a control apparatus for operational management. In order to take the largest possible amount of energy from the wind the control apparatus takes into consideration the height of the location of erection of the wind power installation and/or the height of the wind power installation. The method according to the invention also detects air density, transmits signals which are derived from the air density and which represent the air density to the control apparatus, and the air density is taken into consideration by the control apparatus in operational management.

25 Claims, 1 Drawing Sheet

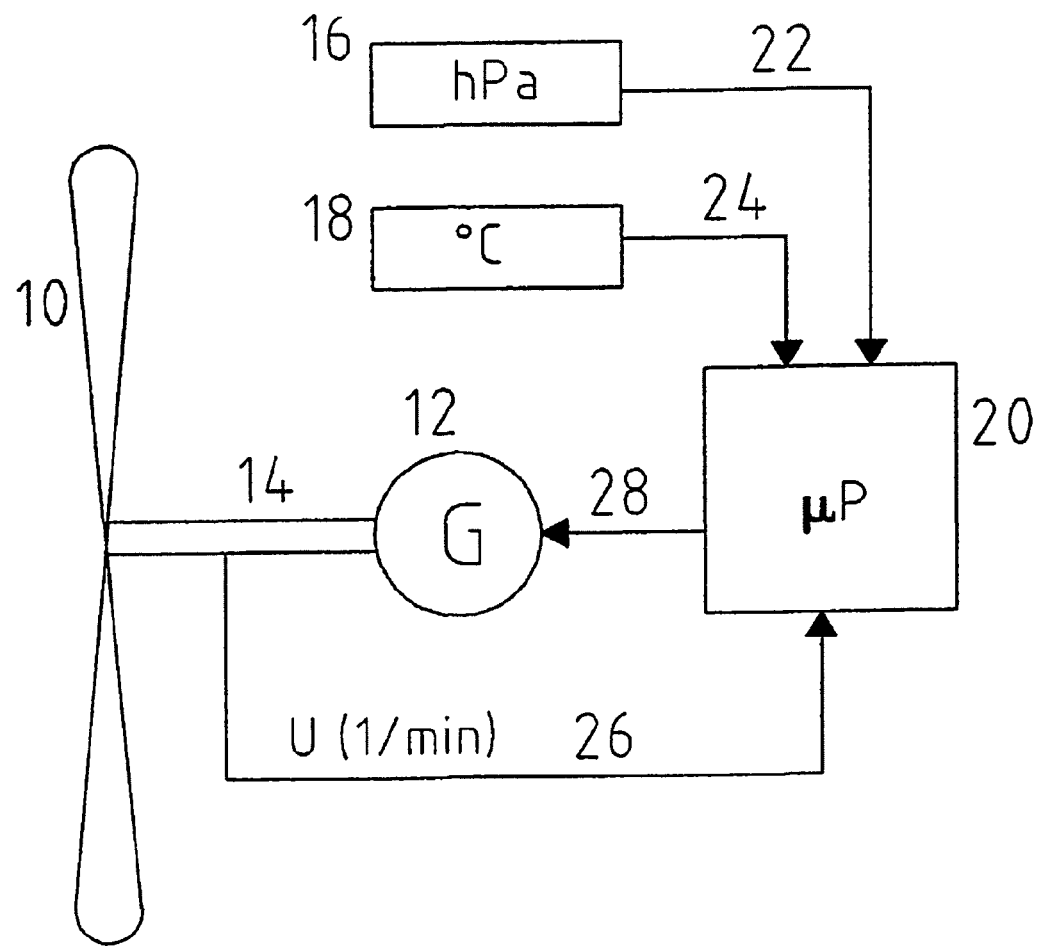
Figure

ATMOSPHERIC DENSITY-DEPENDENT POWER ADJUSTMENT FOR WIND TURBINES

BACKGROUND OF THE INVENTION

The present invention concerns a wind power installation having a control apparatus for operational management of the wind power installation and a method of controlling a wind power installation having a control apparatus for operational management.

A wind power installation converts a part of the kinetic energy contained in the wind into electrical energy. For that purpose the wind power installation has a rotor which takes kinetic energy from the wind and converts it into rotational energy.

DE 198 44 258 A1 discloses a wind power installation and a method for the operation thereof in which, in dependence on sensors, in the presence of the air density at the wind power installation, the operational management system sets the speed at which the wind power installation shuts down at a higher level, with decreasing air density. If therefore, with a normal level of air density, the shut-down speed assumes its predetermined value, the shut-down speed is increased when the air density is less.

Stored in the control apparatus of a wind power installation is a power characteristic which permits the control means of the wind power installation, on the basis of the ascertained rotor speed which is dependent on the wind speed, to ascertain the associated generator power. That generator power which the wind power installation is intended to furnish affords the exciter power required and in turn therefrom the generator moment. In order to produce that required generator moment the rotor must afford at least that rotary moment, by way of the drive train.

The power P of the wind power installation corresponds to the amount of energy flowing through the rotor circuit of the wind power installation and arises out of the cross-sectional area F which corresponds to the circular surface area of the rotor, in accordance with the following equation:

$$P = \tfrac{1}{2} \rho v^3 F\,[W].$$

At a given wind speed v and a predetermined circular surface area F of the rotor, the foregoing equation gives the dependency of the amount of energy on air density $\rho$. If the amount of energy is too low the rotor cannot apply that moment and therefore the rotor speed drops as a consequence of the excessively high generator moment.

SUMMARY OF THE INVENTION

The object of the invention is to optimise operation of a wind power installation insofar as the largest possible amount of energy, that is to say the highest possible power, can always be furnished.

In previous wind power installations, besides a characteristic curve, the high-speed running variable $\lambda$ is also predetermined. In that respect the high-speed running variable corresponds to the quotient of the peripheral speed of the rotor blade tip and the wind speed. As already stated, when the power characteristic is not matched to the corresponding air density, there is a deviation in respect of the high-speed running variable $\lambda$ which is fixed in the control apparatus.

In the present invention the control apparatus takes account of the height of the location of erection of the wind power installation and/or the height of the wind power installation, that is to say the air density which prevails at the site of the wind power installation.

The invention is based on the realisation that air density becomes less with increasing height. The reference scale is always sea level normal zero (NZ). The higher the location at which the wind power installation is erected is above NZ, the corresponding lower is the air density and the correspondingly less is the energy contained in the wind.

It is particularly advantageous in the present invention that taking account of the height of the location of erection of the wind power installation above NZ means that this lower air density is taken into consideration in the power characteristic. In that way the power which is associated with a rotor speed and thus a given high-speed running variable $\lambda$ and which is to be produced by the wind power installation can be suitably adapted, that is to say reduced, so that the generator moment, as a consequence of the exciter power which is introduced by the control apparatus, does not exceed the torque which is furnished by way of the rotor. In that way the level of efficiency which is established by way of the power characteristic is maintained and the maximum energy can be taken from the wind.

In a particularly preferred embodiment of the invention the height of the location of erection of the wind power installation and/or the height of the wind power installation can be adapted, that is to say there can be provided a site-independent control to which the appropriate parameters can be communicated by way of suitable setting means such as switches, configurational parameters etc.

In a preferred development of the invention the wind power installation is provided with a measuring apparatus for detecting the air density and particularly preferably a measuring apparatus for detecting the air pressure and the temperature. The air density can be determined from those two items of data. In that way it is possible to forego setting the parameters as the control apparatus automatically ascertains those parameters from the data acquired by the measuring apparatus.

In a preferred embodiment the control apparatus includes at least one microprocessor so that control of the wind power installation can be implemented on the basis of a control software.

In addition the object of the invention is attained by a method which is characterised in that:

a) the air density is detected, b) signals which are derived from the air density and which represent the air density are transmitted to the control apparatus, and c) the air density is taken into consideration by the control apparatus in operational management.

In that respect in step a) the air pressure and the temperature can be detected and in step b) signals which represent the air density can be derived from the air pressure and the temperature, in accordance with a predetermined algorithm.

Advantageous developments of the invention are recited in the appendant claims.

BRIEF DESCRIPTION OF THE DRAWINGS

The FIGURE is a simplified block diagram representation of one embodiment of the present invention.

DETAILED DESCRIPTION

With reference to the FIGURE, the wind power installation includes a rotor 10, a generator 12, a force transmission 14 between the rotor and the generator, a device 16 for detecting the air pressure, a device 18 for detecting the temperature and a control apparatus 20 with a microprocessor.

The device 16 for detecting the air pressure is connected by way of a connection 22 to the control apparatus 20, the device for detecting the temperature is connected by way of a connection 24 to the control apparatus 20 and the rotor speed is transmitted to the control apparatus 20 by way of a connection 26. Those connections can be for example galvanic connections or other suitable connections such as wireless connections.

From the transmitted items of information, the control apparatus 20 ascertains on the basis of predetermined power data the power which is to be delivered by the generator and, by way of a connection 28, influences the exciter power which is fed to the generator 12.

In this respect the mode of operation of the control apparatus 20 can be predetermined in such a way that changes in air density which can be ascertained from changes in air pressure or temperature are taken into consideration by the control apparatus 20 only when they exceed a predeterminable amount and/or those changes are ascertained for a predeterminable time.

It will be appreciated that, instead of detecting the air density, it is also possible to predetermine a value in respect of air density at the respective site. In this respect for example the height above NZ of the wind power installation or the rotor hub of the wind power installation is also taken into consideration. In a corresponding manner it is also possible to predetermine a mean value in respect of the corresponding air density at the predetermined height and store it in the control apparatus. Accordingly the invention provides that the respective power characteristic of a wind power installation is also adapted to the corresponding air density at the location of the wind power installation. That makes it possible for the level of efficiency of the wind power installation always to be maintained at the maximum possible value, more specifically even when the air density fluctuates to a considerable degree or the wind power installation is erected at some hundred metres above NZ, even if the power characteristic is initially ascertained for a site at a height of 00 above NZ.

The invention claimed is:

1. A method of controlling a wind power installation positioned at an installation location during normal operation, wherein the wind power installation includes a plurality of components including at least one rotor blade and an electrical generator, the method comprising:
determining air density data at the installation location;
determining an exciter power based on the air density data; and
supplying the exciter power to the electrical generator.

2. The method of claim 1 further including determining temperature data and air pressure data at the installation location.

3. The method of claim 2 wherein determining air density data at the installation location includes determining the air density data using the temperature data and air pressure data.

4. The method of claim 1 further including supplying an initial exciter power to the electrical generator wherein the initial exciter power is determined based on a predetermined air density data.

5. The method of claim 4 further including statistically determining the initial exciter power using air density data which corresponds to an air density at a predetermined height, wherein the predetermined height corresponds to a height of the wind power installation when positioned at the installation location.

6. The method of claim 5 further including determining the initial exciter power using air density data which corresponds to the mean value of the air density at the predetermined height.

7. The method of claim 5 wherein the predetermined height corresponds to a height of a rotor hub of the wind power installation when positioned at the installation location.

8. The method of claim 4 wherein determining the exciter power based on the air density data further includes adjusting the initial exciter power based on the air density data at the installation location.

9. The method of claim 4 further including:
monitoring the temperature at the installation location and generating temperature data based thereon;
monitoring the air pressure at the installation location and generating air pressure data based thereon, and wherein:
determining air density data at the installation location includes determining the air density data using the temperature data and air pressure data; and
determining the exciter power using the air density data further includes adjusting the initial exciter power based on the air density data at the installation location when a change in temperature or pressure exceeds a predetermined amount.

10. The method of claim 4 further including:
monitoring the temperature at the installation location and generating temperature data based thereon;
monitoring the air pressure at the installation location and generating air pressure data based thereon, and wherein:
determining air density data at the installation location includes determining the air density data using the temperature data and air pressure data; and
determining the exciter power using the air density data further includes adjusting the initial exciter power based on the air density data at the installation location when a change in temperature or pressure exceeds a predetermined amount for a predetermined amount of time.

11. The method of claim 2 wherein determining air density data at the installation location includes determining the air density data using historical temperatures at the installation location and historical air pressures at the installation location.

12. A wind power installation comprising:
at least one rotor blade;
an electrical generator, coupled to the at least one rotor blade; and
a control device, coupled to the electrical generator, to control the electrical generator by supplying an exciter power, wherein the control device determines an exciter power provided to the electrical generator using air density data determined at an installation location, wherein the installation location is the location where the wind power installation is positioned during normal operation.

13. The wind power installation of claim 12 wherein the air density data at the installation location is predetermined based on a statistical analysis of the air density at a predetermined height, wherein the predetermined height corresponds to a height of the wind power installation when positioned at the installation location.

14. The wind power installation of claim 12 further including a measuring device, coupled to the control device, to detect one or more environmental parameters that the control device uses to determine the air density data at the installation location.

15. The wind power installation of claim 12 wherein the measuring device includes:
   a temperature measuring device to measure temperature data at the installation location; and
   an air pressure measuring device to measure air pressure data at the installation location.

16. The wind power installation of claim 15 wherein the control device calculates the air density at the installation location using the temperature data and air pressure data measured by the temperature measuring device and air pressure measuring device, respectively.

17. The wind power installation of claim 15 wherein the control device is coupled to the temperature measuring device or the air pressure measuring device via wireless connection.

18. The wind power installation of claim 12 further including a storage element, coupled to the control device, to store the air density data.

19. The wind power installation of claim 12 wherein the control device provides an initial exciter power to the electrical generator based on a predetermined air density data.

20. The wind power installation of claim 19 wherein the initial exciter power is predetermined using a statistical analysis of the air density at a predetermined height, wherein the predetermined height corresponds to a height of the wind power installation when positioned at the installation location.

21. The wind power installation of claim 20 wherein the statistical analysis corresponds to a mean value of the air density at the predetermined height.

22. The wind power installation of claim 19 wherein the control unit adjusts the initial exciter power based on the air density data at the installation location.

23. The wind power installation of claim 19 further including:
   a temperature measuring device, coupled to the control unit, to measure temperature at the installation location and output temperature data which is representative of a temperature at the installation location;
   an air pressure measuring device, coupled to the control unit, to measure air pressure at the installation location and output air pressure data which is representative of an air pressure at the installation location; and
   wherein the control unit calculates the air density data using the temperature data and air pressure data and determines the exciter power for the electrical generator by adjusting the initial exciter power based on the calculated air density data when a change in temperature or pressure at the installation location exceeds a predetermined amount.

24. The wind power installation of claim 19 further including:
   a temperature measuring device, coupled to the control unit, to measure temperature at the installation location and output temperature data which is representative of the temperature at the installation location;
   an air pressure measuring device, coupled to the control unit, to measure air pressure at the installation location and output air pressure data which is representative of an air pressure at the installation location; and
   wherein the control unit calculates the air density data using the temperature data and air pressure data and determines the exciter power for the electrical generator by adjusting the initial exciter power based on the calculated air density data when a change in temperature or pressure at the installation location exceeds a predetermined amount for a predetermined amount of time.

25. The wind power installation of claim 12 wherein the control device is a microprocessor.

* * * * *